(12) United States Patent
Suzuki et al.

(10) Patent No.: US 12,149,821 B2
(45) Date of Patent: Nov. 19, 2024

(54) IMAGING APPARATUS WITH SWITCHABLE LOWER-LIMIT VOLTAGE

(71) Applicant: Panasonic Intellectual Property Management Co., Ltd., Osaka (JP)

(72) Inventors: Takashi Suzuki, Osaka (JP); Kazuhiro Ogawa, Osaka (JP); Tomonori Kono, Osaka (JP); Kazuyuki Ohashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/111,037

(22) Filed: Feb. 17, 2023

(65) Prior Publication Data
US 2023/0370715 A1 Nov. 16, 2023

(30) Foreign Application Priority Data

May 10, 2022 (JP) ................. 2022-077747

(51) Int. Cl.
*H04N 23/65* (2023.01)
*H04N 23/63* (2023.01)
*H04N 23/667* (2023.01)

(52) U.S. Cl.
CPC ........... *H04N 23/65* (2023.01); *H04N 23/634* (2023.01); *H04N 23/667* (2023.01)

(58) Field of Classification Search
None
See application file for complete search history.

(56) References Cited

U.S. PATENT DOCUMENTS

2011/0292278 A1* 12/2011 Kurihara ............... H02J 7/0031
324/427

FOREIGN PATENT DOCUMENTS

| JP | H09-130649 A |   | 5/1997 |
|----|--------------|---|--------|
| JP | 2001066489 A | * | 3/2001 |
| JP | 2012-048040 A |   | 3/2012 |
| JP | 2012133222 A | * | 7/2012 |
| JP | 2020-013264 A |   | 1/2020 |
| JP | 6704743 B2 | * | 6/2020 |
| JP | 2020-155932 A |   | 9/2020 |
| JP | 2021-131431 A |   | 9/2021 |

OTHER PUBLICATIONS

Notice of Reasons for Refusal for corresponding Japanese Application No. 2022-077747 dated Jul. 19, 2022 and its machine translation.

* cited by examiner

*Primary Examiner* — Quan Pham
(74) *Attorney, Agent, or Firm* — Renner, Otto, Boisselle & Sklar, LLP

(57) ABSTRACT

An imaging apparatus, which can be mounted with an interchangeable lens and operates with power from a battery, includes: a connection detachably connected to the interchangeable lens; a controller that controls a lower-limit voltage indicating a lower limit for supplying power from the battery; and a selector that selects one operation mode from a plurality of operation modes for operating the imaging apparatus with power from the battery, wherein the controller switches the lower-limit voltage among a plurality of set values respectively corresponding to combinations of types of the interchangeable lens and the plurality of operation modes on a basis of the interchangeable lens connected to the connection and the operation mode selected by the selector.

11 Claims, 12 Drawing Sheets

| SHOOTING OPERATION | SHOOTING MODE | | LOAD FLUCTUATION | POWER CONSUMPTION |
| --- | --- | --- | --- | --- |
| | GENERAL SHOOTING MODE | VIDEO ONLY MODE | | |
| SINGLE-SHOT | ENABLED | DISABLED | SMALL | LOW |
| CONTINUOUS (HIGH SPEED) | ENABLED | DISABLED | LARGE | LOW |
| LOW-LOAD VIDEO | ENABLED | ENABLED | SMALL | MEDIUM |
| HIGH-LOAD VIDEO | DISABLED | ENABLED | SMALL | HIGH |

Fig. 5

| SHOOTING OPERATION | SHOOTING MODE | | LOAD FLUCTUATION | POWER CONSUMPTION |
| --- | --- | --- | --- | --- |
| | GENERAL SHOOTING MODE | VIDEO ONLY MODE | | |
| SINGLE-SHOT | ENABLED | DISABLED | SMALL | LOW |
| CONTINUOUS (HIGH SPEED) | ENABLED | DISABLED | <u>LARGE</u> | LOW |
| LOW-LOAD VIDEO | ENABLED | ENABLED | SMALL | MEDIUM |
| HIGH-LOAD VIDEO | DISABLED | ENABLED | SMALL | <u>HIGH</u> |

Fig. 12A

| SETTING IN LENS CATEGORY A | | | | | | |
|---|---|---|---|---|---|---|
| SHOOTING MODE | LOAD FLUCTUATION | POWER CONSUMPTION | | LOWER-LIMIT VOLTAGE ($V21 < V1 < V10$, $V20 \leq V10$) | | |
| | | BODY | LENS | GENERAL SHOOTING MODE | VIDEO ONLY MODE | (LENS CATEGORY ONLY) |
| SINGLE-SHOT | SMALL | LOW | LOW | V20 ← | — | V10 |
| CONTINUOUS (HIGH SPEED) | LARGE | LOW | LOW | V10 | — | V10 |
| LOW-LOAD VIDEO | SMALL | MEDIUM | LOW | V21 | V21 ← | V10 |
| HIGH-LOAD VIDEO | SMALL | HIGH | LOW | — | V1 ← | V10 |

Fig. 12B

| SETTING IN LENS CATEGORY D | | | | | | |
|---|---|---|---|---|---|---|
| SHOOTING MODE | LOAD FLUCTUATION | POWER CONSUMPTION | | LOWER-LIMIT VOLTAGE ($V21 \leq V22 < V12$, $V10 < V12$) | | |
| | | BODY | LENS | GENERAL SHOOTING MODE | VIDEO ONLY MODE | (LENS CATEGORY ONLY) |
| SINGLE-SHOT | SMALL | LOW | HIGH | V20 ← | — | V12 |
| CONTINUOUS (HIGH SPEED) | LARGE | LOW | HIGH | V10 ← | — | V12 |
| LOW-LOAD VIDEO | SMALL | MEDIUM | HIGH | V22 | V22 ← | V12 |
| HIGH-LOAD VIDEO | SMALL | HIGH | HIGH | — | V12 | V12 |

IMAGING APPARATUS WITH SWITCHABLE LOWER-LIMIT VOLTAGE

BACKGROUND

1. Technical Field

The present disclosure relates to an imaging apparatus that can be mounted with an interchangeable lens and operates with power from a battery.

2. Related Art

JP H09-130649 A discloses a digital still camera having a plurality of recording modes, such as a still image mode, a continuous shooting mode, and a moving image mode, which having different battery voltage levels for performing a stable operation. The digital still camera of JP H09-130649 A stores a battery voltage level necessary for each recording mode as a determination reference value and detects battery empty (that the battery is exhausted) by comparing a detected value of the battery voltage level with the determination reference value. The digital still camera of JP H09-130649 A detects the battery empty for each recording mode and notifies a user of the battery empty without prohibiting the use of the digital still camera so that the battery can be used up to the end effectively.

SUMMARY

An object of the present disclosure is to provide an imaging apparatus capable of efficiently using power in accordance with an interchangeable lens mounted therewith.

An imaging apparatus according to one aspect of the present disclosure can be mounted with an interchangeable lens and operates with power from a battery. The imaging apparatus includes a connector, a controller, and a selector. The connector detachably connect the imaging apparatus with the interchangeable lens. The controller controls a lower-limit voltage indicating a lower limit in supplying power from the battery. The selector selects one operation mode from a plurality of operation modes in which the imaging apparatus is operated with power from the battery. The controller switches the lower-limit voltage among a plurality of set values, based on an interchangeable lens connected to the connector and the operation mode selected by the selector, the plurality of set values each corresponding to a combination of combinations of types of the interchangeable lens and the plurality of operation modes.

According to the imaging apparatus of the present disclosure, power can be efficiently used in accordance with the interchangeable lens mounted.

BRIEF DESCRIPTION OF THE DRAWINGS

FIG. 5 is a diagram for explaining a shooting mode in the digital camera;

FIGS. 12A and 12B are diagrams for explaining the setting processing for the lower-limit voltage in the digital camera according to the second embodiment.

DETAILED DESCRIPTION

Hereinafter, embodiments will be described in detail with reference to the drawings as needed. However, explanation more detailed than necessary may be omitted. For example, detailed descriptions of well-known matters and redundant explanations for substantially the same configuration may be omitted. This is to avoid unnecessary redundancy of the following description and to facilitate understanding by those skilled in the art. It is to be noted that the inventor(s) provides the accompanying drawings and the following description in order to enable those skilled in the art to fully understand the present disclosure, and does not intend to limit the claimed subject matter by them.

Hereinafter, embodiments will be described in detail with reference to the drawings.

First Embodiment

Hereinafter, a digital camera according to an embodiment will be described with reference to the drawings.

1. Configuration

Hereinafter, a configuration of the digital camera will be described with reference to the drawings.

Figure 1:
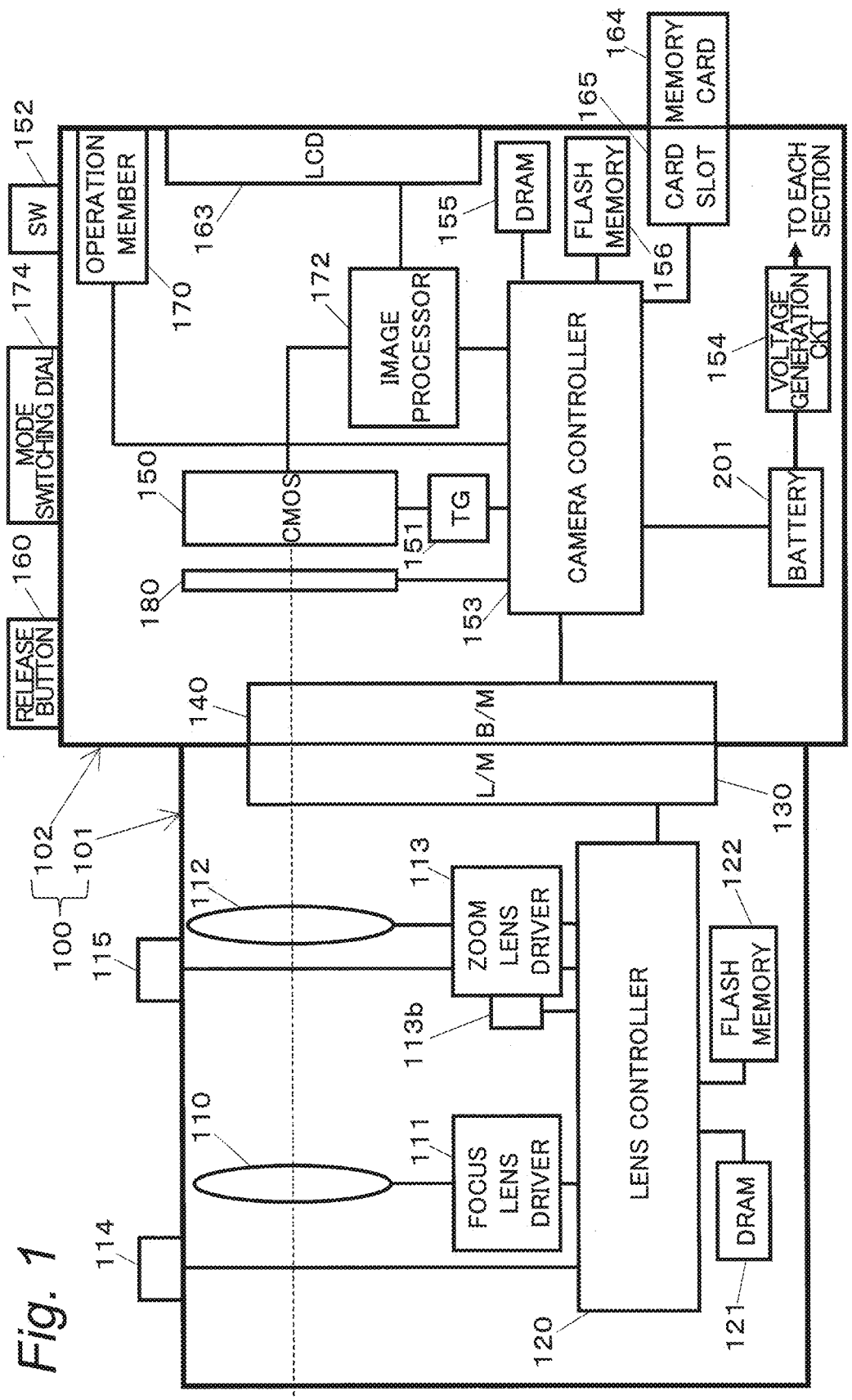
FIG. 1 is a block diagram showing a configuration of a digital camera according to a first embodiment of the present disclosure.

FIG. 1 is a block diagram showing a configuration of a digital camera 100 according to a first embodiment. The digital camera 100 includes a camera body 102, and an interchangeable lens 101 that can be mounted to the camera body 102. The battery 201 can be detachably mounted to the camera body 102, for example. The interchangeable lens 101 has a zoom lens 112 driven by a zoom lens driver 113. The camera body 102 can electrically drive the zoom lens 112 via a lens controller 120. That is, the interchangeable lens 101 is an electrically-powered zoom lens.

1-1. Configuration of Camera Body

The camera body 102 includes a complementary metal-oxide-semiconductor (CMOS) image sensor 150, a liquid crystal monitor (LCD monitor) 163, an image processor 172, a timing generator (TG) 151, a camera controller 153, a body mount 140, a release button 160, an operation member 170, a mode switching dial 174, a battery 201, a power switch 152, a voltage generation circuit 154, a dynamic random-access memory (DRAM) 155, a flash memory 156, a card slot 165, and a shutter 180.

The camera controller 153 controls an overall operation of the digital camera 100 by controlling each section of the digital camera 100 such as the CMOS image sensor 150, in accordance with an instruction such as an operation signal from an operation member such as the release button 160 or the operation member 170.

For example, the camera controller 153 transmits a vertical synchronization signal to the timing generator 151. In parallel with the transmission of the vertical synchronization signal, the camera controller 153 generates an exposure synchronization signal based on the vertical synchronization signal. The camera controller 153 periodically and repeatedly transmits the generated exposure synchronization signal to the lens controller 120 via the body mount 140 and a lens mount 130. This allows the camera controller 153 to control a lens such as a focus lens 110 in the interchangeable lens 101 to be synchronized with timing of exposure.

The camera controller 153 uses the DRAM 155 as a work memory at a time of a control operation and an image processing operation. The camera controller 153 may be configured by a hard-wired electronic circuit, or may be configured by a microcomputer or the like that executes a program. In addition, the camera controller 153 may be configured as one semiconductor chip together with the image processor 172 and the DRAM 155, or may be configured as a separate semiconductor chip.

The CMOS image sensor 150 is configured to include a light receiving element, a gain control amplifier (AGC), and an analog-to-digital (AD) converter. The light receiving element converts an optical signal collected by the interchangeable lens 101 into an electric signal to generate image information. Further, the AGC amplifies an electrical signal output from the light receiving element. The AD converter converts an electrical signal output from the AGC into a digital signal.

The CMOS image sensor 150 operates at timing controlled by the timing generator 151. Operations of the CMOS image sensor 150 controlled by the timing generator 151 include an imaging operation for a still image, an imaging operation for a through image, a data transfer operation, an electronic shutter operation, and the like. The through image is mainly a video, and is displayed on the LCD monitor 163 in order for a user to determine a composition for capturing a still image. The CMOS image sensor 150 outputs the generated image information to the image processor 172. Instead of the CMOS image sensor 150, another imaging element, such as an n-channel metal-oxide semiconductor (NMOS) image sensor or a charge-coupled device (CCD) image sensor, may be used.

The image processor 172 performs predetermined image processing on image data converted into a digital signal by the AD converter in the CMOS image sensor 150. Possible predetermined image processing includes, but is not limited to, gamma correction processing, white balance correction processing, flaw correction processing, YC conversion processing, digital zoom processing, compression processing, and expansion processing, for example.

The LCD monitor 163 is a display disposed on the back surface of the camera body 102. The LCD monitor 163 displays an image indicated by display image information processed by the image processor 172. The LCD monitor 163 can selectively display a moving image and a still image. The LCD monitor 163 can also display an image for notifying the user of information such as setting conditions of the digital camera 100. In the present embodiment, the camera body 102 includes the LCD monitor 163 as an example of the display, but the display is not limited to this. For example, the camera body 102 may include an organic electroluminescent (EL) display as the display.

The flash memory 156 functions as an internal memory to store image information and the like. Further, the flash memory 156 stores programs and parameters used when the camera controller 153 performs control. In addition, the flash memory 156 stores, lens current data related to the interchangeable lens 101 (described later) and a set value table for a lower-limit voltage (described later), for example.

The card slot 165 is a connection means that enables a memory card 164 to be mounted to the camera body 102. The card slot 165 can connect the memory card 164 electrically and mechanically. The card slot 165 may have a function of controlling the memory card 164.

The memory card 164 is an external memory that is internally provided with a storage element such as a flash memory. The memory card 164 can store data such as image information processed by the camera controller 153. Further, the memory card 164 can output data such as image information stored therein. The image data read out from the memory card 164 is processed by the camera controller 153 or the image processor 172 and displayed on the LCD monitor 163, for example. In the present embodiment, the memory card 164 is shown as an example of the external memory, but the external memory is not limited to this. For example, a recording medium such as an optical disc can be used as the external memory.

The body mount 140 can be mechanically and electrically connected to the lens mount 130 (described later) of the interchangeable lens 101. The body mount 140 can transfer data between the camera body 102 and the interchangeable lens 101 via the lens mount 130. The body mount 140 transmits an exposure synchronization signal and other control signals received from the camera controller 153, to the lens controller 120 via the lens mount 130. Further, the body mount 140 transmits a signal received from the lens controller 120 via the lens mount 130, to the camera controller 153.

The battery 201 supplies power for driving the digital camera 100. For example, the battery 201 may be a dry battery or a rechargeable battery. Further, instead of the battery, power supplied from outside through a power cord may be supplied to the digital camera 100. A power supply of the digital camera 100 is switched between on and off by the power switch 152 operated by the user. When the power supply is turned on, the camera controller 153 supplies power to each section in the camera body 102. Further, the camera controller 153 also supplies power to the interchangeable lens 101 via the body mount 140 and the lens mount 130. Then, in the interchangeable lens 101, power is supplied to each section of the interchangeable lens 101 by the lens controller 120.

The voltage generation circuit 154 includes a DC-to-DC (DC/DC) converter, a regulator, and the like, to supply power from the battery 201 to each section (load unit) of the digital camera 100. For example, the voltage generation circuit 154 includes a voltage detection circuit that is connected to the battery 201 and detects a battery voltage. The battery voltage is a voltage corresponding to the remaining capacity of the battery 201. The voltage detection circuit is configured by a voltage-dividing resistor circuit connected between a positive electrode and a negative electrode of the battery 201, for example. The voltage detection circuit generates a detection signal indicating a detected value of the battery voltage, such as a divided voltage, to output the detection signal to the camera controller 153. The voltage generation circuit 154 converts a voltage supplied from the power supply into a voltage suitable for each section when supplying power to each section.

The release button 160 receives an operation of an imaging instruction or an auto-focus instruction from the user. The release button 160 allows two-step operation of half press and full press. The camera controller 153 performs an auto-focus operation by the half-press operation by the user on the release button 160. By the full-press operation by the user on the release button 160, the camera controller 153 records image data generated in accordance with timing of the full-press operation, in the memory card 164.

The operation member 170 is a generic term of hard keys such as an operation button and an operation lever provided on the exterior of the digital camera 100, to receive an operation by the user. Further, the operation member 170 includes a touch panel that receives a touch operation on the display of the LCD monitor 163, for example. When receiving an operation by the user, the operation member 170 transmits an operation signal corresponding to the user operation, to the camera controller 153.

The operation member 170 includes a cross button capable of receiving operation instructions in up, down, left, and right directions, for example. When the interchangeable lens 101 having an electric zoom function is mounted to the camera body 102, the camera controller 153 individually assigns functions as zoom operation buttons to the left and the right buttons of the operation member 170. For example, the camera controller 153 assigns a function as a zoom operation button in a wide-end side direction to the left button, and assigns a function as a zoom operation button in a tele-end side direction to the right button. In a case that the interchangeable lens 101 having the electric zoom function mounted on the camera body 102 has a zoom lever for the user to perform a zoom operation, the function as the zoom operation button does not necessarily need to be assigned to the operation member 170.

The mode switching dial 174 is a dial provided on the upper surface of the camera body 102 to select and switch various operation modes in the digital camera 100, for example. For example, in the digital camera 100 of the present embodiment, the mode switching dial 174 receives a user operation to switch between a general shooting mode for mainly shooting a still image and a video only mode in which only various moving images can be shot. For example, when receiving the user operation, the mode switching dial 174 transmits a corresponding operation signal to the camera controller 153. Details of the various operation modes will be described later.

The shutter 180 adjusts an exposing time (exposure time) of light incident on the CMOS image sensor 150. For example, the shutter 180 is driven by a drive system such as a DC motor or a stepping motor in accordance with a control signal issued from the camera controller 153. For example, the camera controller 153 can control a driving speed (shutter speed or continuous-shooting speed) at which the shutter 180 is driven.

1-2. Configuration of Interchangeable Lens

The interchangeable lens 101 includes the focus lens 110, a focus lens driver 111, a focus ring 114, the zoom lens 112, the zoom lens driver 113, a zoom ring 115, the lens controller 120, a DRAM 121, a flash memory 122, and the lens mount 130. The interchangeable lens 101 may further include a camera shake correction lens in addition to the lenses shown in FIG. 1.

The lens controller 120 controls an overall operation of the interchangeable lens 101. The lens controller 120 may be configured by a hard-wired electronic circuit, or may be configured by a microcomputer or the like that executes a program.

The DRAM 121 functions as a work memory to be used when the lens controller 120 performs control. The flash memory 122 stores programs, parameters, lens data, and the like to be used in control by the lens controller 120. The lens data includes characteristic values unique to the interchangeable lens 101, such as a lens name, a lens ID, a lens model, a serial number, an F number, and a focal distance. As described later, the lens controller 120 can notify the camera controller 153 with lens data, and the camera controller 153 can execute various control operations in accordance with the lens data. For example, the camera controller 153 identifies the interchangeable lens 101 based on the lens data. The flash memory 122 stores lens current data (described later). The lens data and the lens current data are examples of lens information in the present embodiment.

The zoom lens 112 is a lens to change magnification of an object image formed by an optical system of the interchangeable lens 101. The zoom lens 112 may be composed of any number of lenses or any number of groups of lenses.

The zoom lens driver 113 is a mechanical mechanism that moves the zoom lens 112 along the optical axis of the optical system based on an operation of the zoom ring 115 by the user. A position of the zoom lens 112 is detected by a zoom lens position detector 113b at any time, and notified to the lens controller 120.

The focus lens 110 is a lens to change a focus state of an object image that is incident from the optical system and formed on the CMOS image sensor 150. The focus lens 110 may be composed of any number of lenses or any number of groups of lenses.

The focus ring 114 is provided on the exterior of the interchangeable lens 101. When the focus ring 114 is operated by the user, information on an operation amount of the focus ring 114 is notified to the lens controller 120. The lens controller 120 controls the focus lens driver 111 to drive the focus lens 110 based on the notified information on the operation amount of the focus ring 114. For this reason, the lens controller 120 recognizes a position of the focus lens 110.

The focus lens driver 111 drives the focus lens 110 to move forward or backward along the optical axis of the optical system, based on the control by the lens controller 120. The focus lens driver 111 can be realized by a stepping motor, a DC motor, an ultrasonic motor, or the like, for example.

1-3. Lens Current Data

Figure 2A:
FIGS. 2A and 2B are diagrams for explaining a lens current table in a digital camera and an interchangeable lens.
Figure 2B:

Lens current data stored in each of the flash memory 156 of the camera body 102 and the flash memory 122 of the interchangeable lens 101 will be described with reference to FIGS. 2A and 2B. FIGS. 2A and 2B are diagrams for explaining lens current data in the digital camera 100 of the present embodiment.

For example, the lens current data is managed by associating the lens model of the interchangeable lens 101 with the maximum current flowing through the interchangeable lens 101 during various operations of the digital camera 100, that is, the maximum value of the consumption current in the interchangeable lens 101. FIG. 2A illustrates a table T1 of the lens current data stored in the flash memory 156 of the camera body 102 (hereinafter referred to as "body table T1"). FIG. 2B illustrates a table T2 of the lens current data stored in the flash memory 122 of the interchangeable lens 101 (hereinafter referred to as "lens table T2"). The lens current data is an example of information specifying the power consumption of the interchangeable lens 101 in the present embodiment.

The maximum current in the lens current data includes a current value in each case of "steady state" and "video state" corresponding to the operation of the digital camera 100, for example. For example, the steady state corresponds to a case where a shooting mode of the digital camera 100 is the general shooting mode (described later), and the video state corresponds to a case where the shooting mode is the video only mode (described later).

The body table T1 stores the maximum current measured in advance for each lens model, for example. In addition to the maximum current, as shown in FIG. 2A, the body table T1 stores lens category in which the magnitude of the maximum current is classified to one of a plurality of categories in association with the lens models, for example. For example, as the lens classification, four categories of "A" to "D" are provided in ascending order of the maximum current. For example, each lens model is classified into one of the lens categories A to D based on the respective maximum currents in each case of the steady state and the video state. For example, the lens categories A to D correspond to cases where the current value is less than 400 mA, 400 mA or more and less than 600 mA, 600 mA or more and less than 800, and 800 mA or more, respectively.

The lens table T2 illustrated in FIG. 2B stores the standard value of the maximum current in each case of the steady state and the video state, which is determined for each interchangeable lens 101, for example. In the lens table T2, the maximum current of the lens table T2 is not limited to this, and a value similar to that in the body table T1 may be stored, for example. The lens category may be stored in the lens table T2 as in the body table T1.

2. Operation

Hereinafter, an operation of the digital camera 100 configured as described above will be described.

The digital camera 100 according to the present embodiment performs various operations to capture an object image to generate image data in various operation modes. Such various operations are performed in a state where the lower-limit voltage in the battery voltage of the battery 201 is set in the digital camera 100 in advance. The lower-limit voltage indicates a lower-limit of voltage value at which the digital camera 100 ensures operable power. For example, when the battery voltage decreases to the lower-limit voltage or below, the digital camera 100 performs a process automatically stopping the operation of the digital camera 100 and turning off the power.

2-1. Outline of Operation

The digital camera 100 of the present embodiment dynamically sets the lower-limit voltage in accordance with the interchangeable lens 101 and the like to be used. The outline of the operation of the digital camera 100 will be described with reference to FIGS. 3 to 4B.

The lower-limit voltage is set in consideration of predetermined conditions related to the stability of various operations of the digital camera 100. For example, the predetermined conditions are the following conditions (1) and (2).

(1) Ensuring power for normally performing a process to turn off the power supply when an operation in which a load fluctuates particularly steeply (e.g., high-speed continuous shooting) is performed near the lower-limit voltage.

(2) Suppressing the current supplied from the battery 201 to a predetermined value or less when an operation in which power constantly used, that is, a continuous load, is particularly high (e.g., shooting of a high-quality moving image) is performed near the lower-limit voltage.

Figure 3:
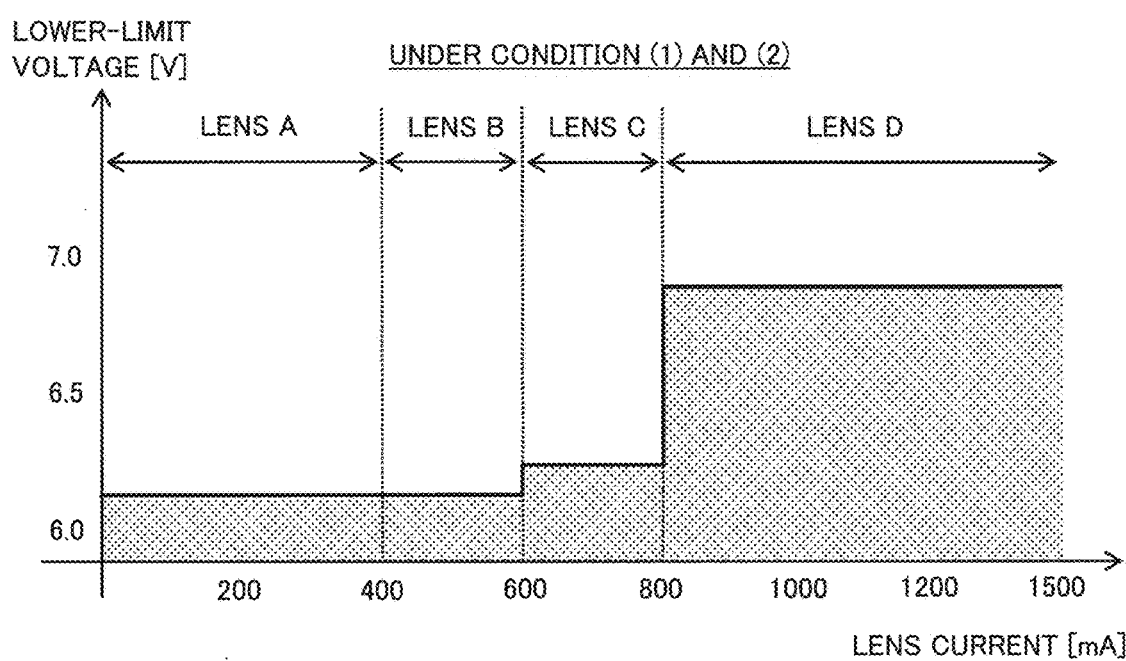
FIG. 3 is a diagram for explaining a possible example of a lower-limit voltage in accordance with the interchangeable lens.

The predetermined value in condition (2) is defined by an allowable value in the standard of the battery 201, for example. FIG. 3 shows a possible example of setting the lower-limit voltage for each type of interchangeable lens 101 according to the above conditions (1) and (2).

In FIG. 3, the horizontal axis represents the lens current in milliamperes (mA), and the vertical axis represents the lower-limit voltage in volts (V). The lens current indicates the consumption current of the interchangeable lens 101 during various operations of the digital camera 100 and corresponds to the maximum current in the lens current data described above, for example. The lower-limit voltage in FIG. 3 is set so as to satisfy both conditions (1) and (2) above in each of the lens categories A to D as the types of the interchangeable lens 101 in accordance with the lens current.

Here, in the lens categories A, B in which the lens current is relatively small, a stable operation may be achieved even at a battery voltage lower than the lower-limit voltage of the example in FIG. 3 during operation when load fluctuations do not occur as much as in condition (1), for example. On the other hand, in the lens categories C, D where the lens current is relatively large, a the operation may be stably performed even at a battery voltage lower than the lower-limit voltage of the example in FIG. 3 during operation when the power consumption is not as large as condition (2), for example. Thus, according to the setting of the lower-limit voltage as in the example of FIG. 3, depending on the operation of the digital camera 100, the set lower-limit voltage is higher than necessary. This makes it difficult to efficiently use the battery voltage, which is problematic.

Therefore, the digital camera 100 of the present embodiment sets the lower-limit voltage in accordance with the interchangeable lens 101 separately between first and second operation modes in each of which one of the operation subject to condition (1) and the operation subject to condition (2) can be executed while the execution of the other operation is restricted.

Figure 4A:
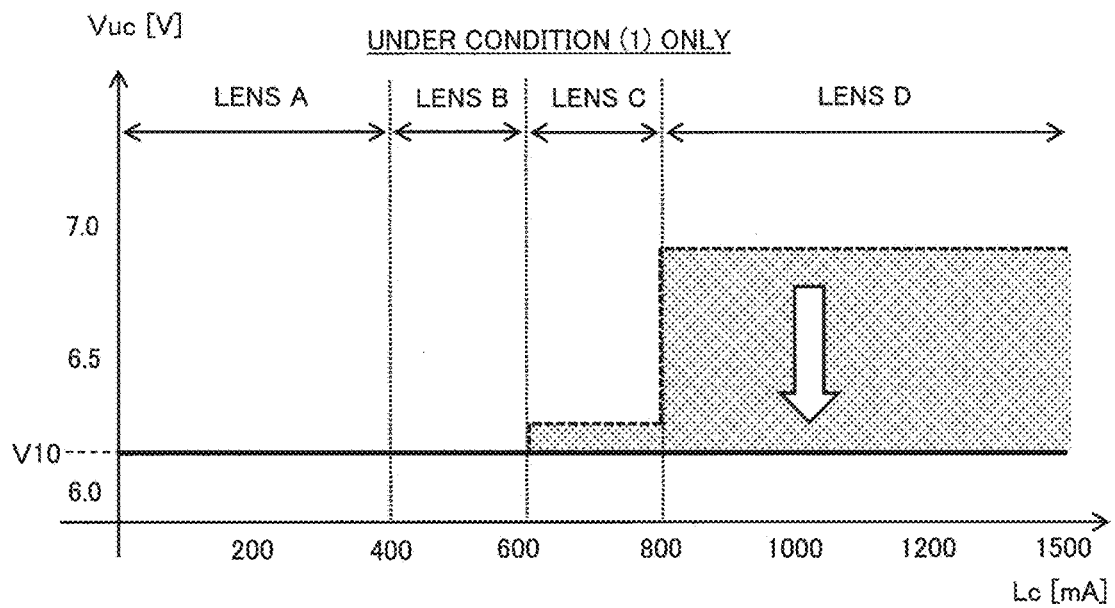
FIGS. 4A and 4B are diagrams for explaining an outline of an operation of a digital camera according to a first embodiment.
Figure 4B:
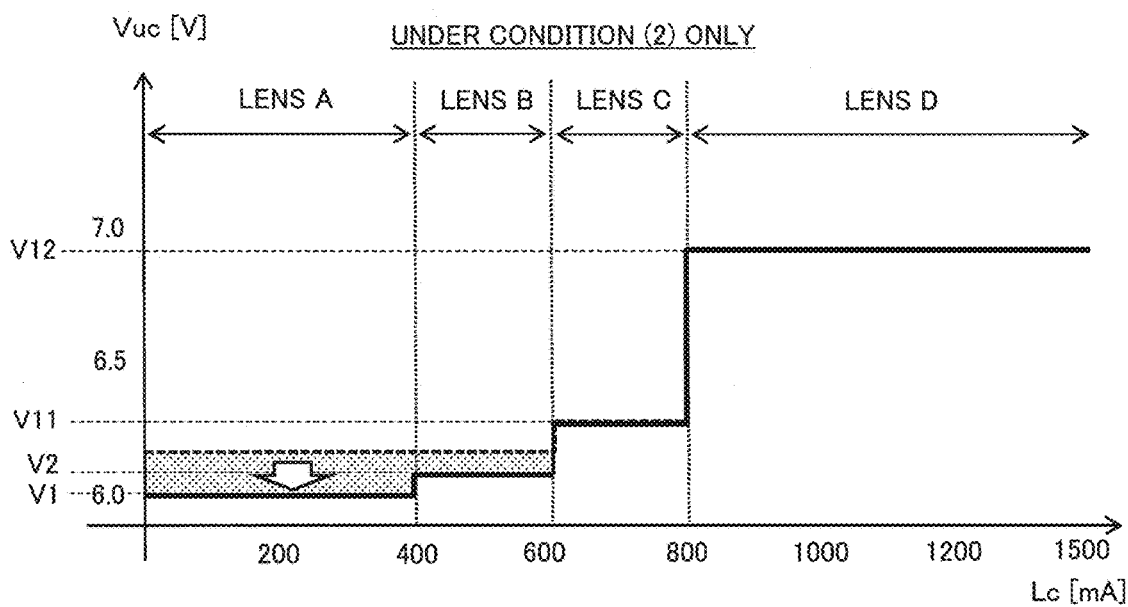

FIGS. 4A and 4B are diagrams for explaining the outline of the operation of the digital camera 100 of the present embodiment. FIGS. 4A and 4B show the relationship between a lens current Lc and a set lower-limit voltage Vuc respectively on the horizontal axis and the vertical axis similar to FIG. 3.

FIG. 4A shows an example of setting the lower-limit voltage Vuc in the first operation mode. For example, the first operation mode is the general shooting mode described later, in which the operation in condition (1) can be executed while the execution of the operation in condition (2) is restricted. In this case, the lower-limit voltage Vuc can be set considering only condition (1) without considering condition (2). Thus, as shown in FIG. 4A, in the lens categories C, D where the lens current is relatively large, the lower-limit voltage Vuc can be reduced compared with the case of FIG. 3, for example.

FIG. 4B shows an example of setting the lower-limit voltage Vuc in the second operation mode. For example, the second operation mode is a video only mode described later, in which the operation in condition (2) can be executed while the execution of the operation in condition (1) is restricted. In this case, the lower-limit voltage Vuc can be set considering only condition (2) without considering condition (1). Thus, as shown in FIG. 4B, in the lens categories A, B where the lens current is relatively small, the lower-limit voltage Vuc can be reduced compared with the case of FIG. 3, for example.

As described above, by separately setting the lower-limit voltage Vuc for each operation mode in which one of the operations in respective conditions (1) and (2) is restricted, it is possible to avoid that the lower-limit voltage Vuc is set higher than necessary in each of conditions (1) and (2), for example. This enables effective use of the power of the battery 201 in the digital camera 100. Details of the operation of the digital camera 100 in the present embodiment will be described below.

2-2. Shooting Mode

In the present embodiment, as the first and second operation modes, in which the lower-limit voltage Vuc is separately set as described above, shooting modes each managing whether or not a shooting operation can be executed are used. FIG. 5 is a diagram for explaining the shooting mode in the digital camera 100 of the present embodiment.

For example, as shown in FIG. 5, the shooting modes of digital camera 100 includes a general shooting mode and a video only mode. Various shooting modes are switched and selected by a user operation on the mode switching dial 174, for example. FIG. 5 shows whether or not various shooting operations can be executed for each of such shooting modes, the load fluctuation in each shooting operation, and the magnitude of power consumption required for each shooting operation.

The general shooting mode is a shooting mode to execute a general-purpose shooting operation in the digital camera 100. For example, as shown in FIG. 5, in the general shooting mode, single-shot shooting, high-speed continuous shooting, and low-load video shooting can be executed, while high-load video shooting cannot be executed. Examples of the general shooting mode include various shooting modes such as program auto (P), aperture priority (A), shutter speed priority (S), and manual (M), which are mainly for still image shooting, depending on automatic or user settings of an aperture value, a shutter speed, and the like.

The video only mode is a shooting mode specialized for various types of moving image shooting in the digital camera 100. For example, as shown in FIG. 5, the video only mode is a shooting mode in which low-load and high-load video shooting can be executed while single-shot and continuous shooting in still image shooting cannot be executed. For example, in the video only mode, various shooting parameters such as image quality, a frame rate, and a codec can be adjusted for moving image shooting.

Hereinafter, an operation mode executing each shooting operation is also referred to as a "drive mode". For example, the various drive modes of the digital camera 100 include a single-shot mode, a high-speed continuous shooting mode, a low-load video mode, and a high-load video mode. In the single-shot mode, single-shot shooting to shoot a still image without executing continuous shooting is executed. In the high-speed continuous shooting mode, high-speed continuous shooting is executed in which still images are continuously shot at a continuous-shooting speed of a predetermined value (e.g., 10 images/second) or more.

In the low-load video mode, low-load video shooting is executed in which a moving image is shot using image quality (e.g., high definition (HD), full HD (FHD) or 4K) and a frame rate (e.g., less than 60 fps) lower than those in the high-load video shooting operation described later, for example. In the high-load moving image mode, high-load moving image shooting is executed in which a moving image is shot using high image quality such as 8 K higher than that of a low-load moving image and a predetermined frame rate (e.g., 60 fps) or more.

For example, the digital camera 100 receives a user operation selecting each drive mode through the operation member 170 on a menu screen displayed on the LCD monitor 163. For example, the digital camera 100 of the present embodiment restricts the drive modes selectable on the displayed menu screen in accordance with whether the shooting mode selected by the mode switching dial 174 is the general shooting mode or the video only mode.

For example, in the high-speed continuous shooting mode among the various drive modes the shutter 180 and the like require significantly high power (e.g., 15 W or more) during continuous shooting, and the load fluctuates temporarily increasing every time the shutter 180 is driven. As described above, the load fluctuation is large in the high-speed continuous shooting mode, and the load fluctuation is smaller in other drive modes than in the high-speed continuous shooting mode.

Further, in the high-load moving image mode the image processor 172 requires significantly high power continuously during shooting of a moving image, and the power consumption is higher than that in other shooting modes, for example. The low-load video mode can operate with less power than in the high-load video mode, but requires more power than each of the single-shot mode and the high-speed continuous shooting mode. The power consumption is moderate (i.e., medium degree) in the low-load video mode.

In the digital camera 100 of the present embodiment, as in the example of FIG. 5, the general shooting mode allows selecting the high-speed continuous shooting mode with a large load fluctuation, while restricts selecting the high-load video mode with a large continuous load. Hence in the general shooting mode, only the above condition (1) needs to be considered, and as shown in FIG. 4A, the lower-limit voltage Vuc can be reduced when the interchangeable lens 101 with a large lens current Lc, such as in the lens category C or D, is mounted, for example.

In contrast, the video only mode allows selecting the high-load video mode, while restricts selecting the high-speed continuous shooting mode. Hence in the video only mode, only the above condition (2) needs to be considered, and as shown in FIG. 4B, the lower-limit voltage Vuc can be reduced when the interchangeable lens 101 with a small lens current Lc, such as in the lens category A or B, is mounted, for example.

2-3. Setting Processing for Lower-Limit Voltage

A processing to dynamically set the lower-limit voltage Vuc for each of combinations of the various shooting modes and the interchangeable lens 101 in the digital camera 100 of the present embodiment, as described above, will be described with reference to FIGS. 6 and 7.

Figure 6:
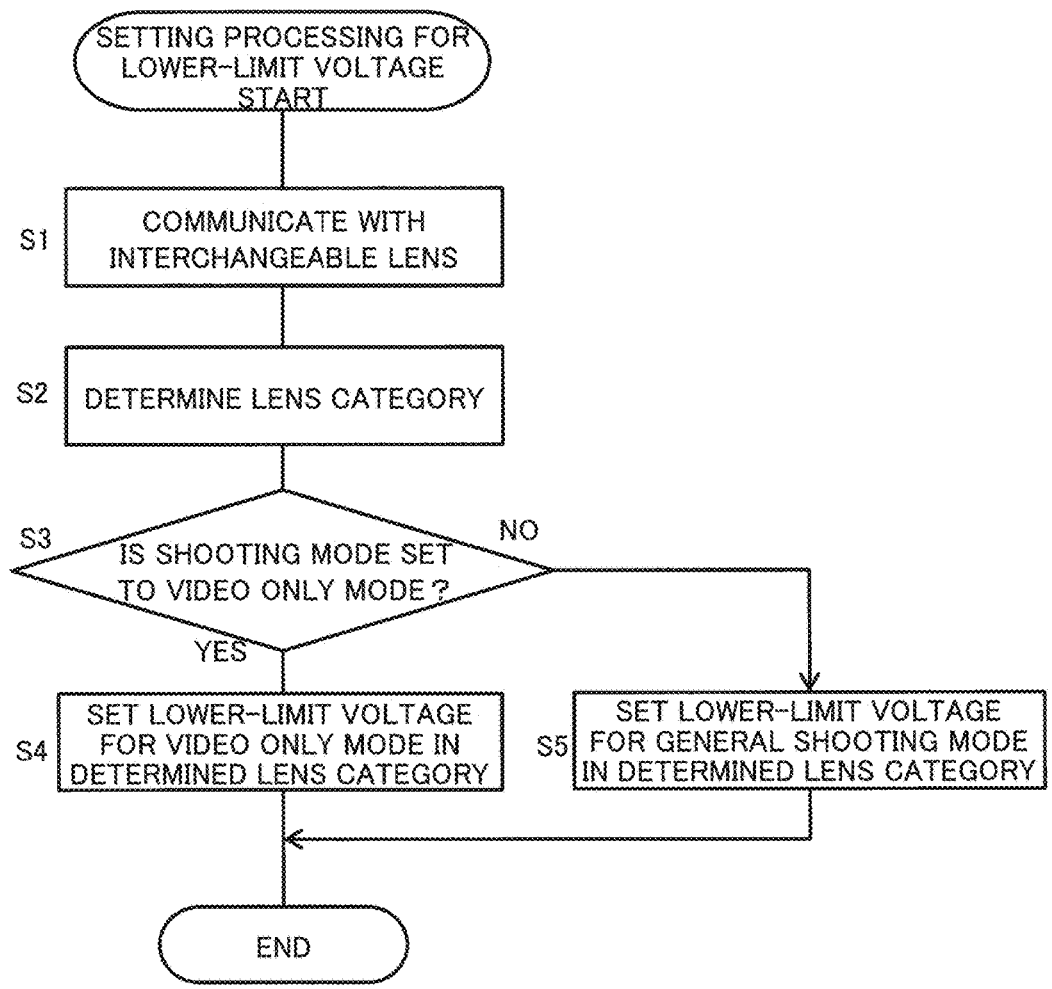
FIG. 6 is a flowchart illustrating a setting processing for the lower-limit voltage in the digital camera according to the first embodiment.
Figure 7:
FIG. 7 is a diagram for explaining a set value table for a lower-limit voltage in the digital camera.

FIG. 6 is a flowchart illustrating the setting processing for the lower-limit voltage Vuc in the digital camera 100 of the present embodiment. FIG. 7 is a diagram for explaining a set value table for the lower-limit voltage Vuc.

The flowchart shown in FIG. 6 is started in the digital camera 100 when the interchangeable lens 101 is mounted to the camera body 102, for example. Each process illustrated in the present flowchart is performed by the camera controller 153 of the digital camera 100, for example.

First, the camera controller 153 performs data communication with the interchangeable lens 101 via the body mount 140 and the lens mount 130 (S1). For example, the camera controller 153 acquires lens data stored in the flash memory 122 of the interchangeable lens 101.

The camera controller 153 determines the lens category of the mounted interchangeable lens 101 based on the acquired lens data, for example (S2). For example, the camera controller 153 determines in which of the lens categories A to D the lens model in the lens data is classified, referring to the body table T1 in the flash memory 156 as shown in FIG. 2A.

When there is no data on the lens model in the body table T1, the camera controller 153 requests the lens controller 120 to transmit the lens table T2 as shown in FIG. 2B, for example. In this case, the camera controller 153 determines the lens category based on the received value of the maximum current in the lens table T2, using the same criteria as the lens categories A to D in the body table T1, for example.

When the camera controller 153 cannot communicate with the interchangeable lens 101 in step S1, the camera controller 153 may determine in step S2 that the interchangeable lens 101 of the lens category D, which has the highest power consumption among the lens categories A to D, is mounted.

Next, the camera controller 153 determines whether the shooting mode currently set in the digital camera 100 is the video only mode or the general shooting mode instead of the video only mode (S3). For example, the camera controller 153 makes the determination in step S3 based on the shooting mode being selected with the mode switching dial 174 in the digital camera 100.

When the shooting mode is the video only mode (YES in S3), the camera controller 153 sets the lower-limit voltage Vuc for the video only mode as shown in FIG. 4B in accordance with the lens category determined in step S2, for example (S4). The camera controller 153 performs the process of step S4 with reference to a set value table Tv for the lower-limit voltage Vuc as shown in FIG. 7, for example.

The set value table Tv of FIG. 7 stores the set value of the lower-limit voltage Vuc in each shooting mode of the general shooting mode and the video only mode for each of the lens categories A to D. The set value table Tv is stored in advance in the flash memory 156 or the like, for example.

For example, in step S4, the camera controller 153 determines a set value from the set values V1 to V12 for the video only mode in the set value table Tv in accordance with the lens category determined in step S2. Then the camera controller 153 holds the determined set value in the DRAM 155 or the like as a setting result. In the example of FIG. 7, the lower-limit voltages Vuc in the video only mode for the respective lens categories A to D are set to set values V1, V2, V11, V12 (e.g., V1<V2<V11<V12) (cf. FIG. 4B).

On the other hand, when the shooting mode is not the video only mode but the general shooting mode (NO in S3), the camera controller 153 sets the lower-limit voltage Vuc for the general shooting mode as shown in FIG. 4A in accordance with the lens category determined in step S2, for example (S5). For example, similarly to step S4, the camera controller 153 performs step S5 with reference to the set value table Tv illustrated in FIG. 7 and holds the setting result. In the example of FIG. 7, in step S5, the lower-limit voltage Vuc in the general shooting mode is set to the set value V10 (e.g., V2<V10<V11) in any of the lens categories A to D.

When the lower-limit voltage Vuc is set in step S4 or S5, the camera controller 153 ends the processing of the present flowchart.

According to the above processing, the lens category is determined based on the data acquired by the communication with the interchangeable lens 101 (S1, S2), and the lower-limit voltage Vuc is set for each shooting mode of the video only mode or the general shooting mode in accordance with the determination result of the lens category (S3 to S5). It is thereby possible to realize the setting of the lower-limit voltage Vuc optimized with respect to both the lens category of the mounted interchangeable lens 101 and the selected shooting mode. Thereafter, using the lower-limit voltage Vuc set in this manner, it is possible to execute a selected shooting operation in the shooting mode while avoiding a situation in which the power of the battery 201 cannot be used effectively.

For example, the high-load video mode selectable in the video only mode constantly requires high power. Therefore, particularly when the power consumption of the interchangeable lens 101 is high, the current flowing from the battery 201 increases due to a decrease in battery voltage, and when the lower-limit voltage Vuc is low as in condition (2) above, the current value may exceed a predetermined value allowed for safety. From the viewpoint of avoiding this, in the video only mode, set values V11 and V12 high enough to satisfy condition (2) are set to the lower-limit voltage Vuc respectively for the lens categories C and D where the lens current Lc is large and the power consumption is high, for example (S4).

On the other hand, for the lens categories A and B having small power consumption, in the video only mode, the set values V1 and V2 are respectively set to the lower-limit voltage Vuc as shown in FIG. 4B, wherein the set values V1 and V2 being smaller than the set values V11 and V12 for the lens categories C and D, for example (S4). Furthermore, the set values V1, V2 for the lens categories A, B in the video only mode are smaller than the set value V10 in the general shooting mode corresponding to condition (1), as shown in FIG. 4A, for example. Therefore, in the video only mode, the lower-limit voltage Vuc can be reduced in the lens categories A, B more than in the general shooting mode.

In the high-speed continuous shooting mode selectable in the general shooting mode, the load fluctuation is caused by driving the shutter 180 of the camera body 102 at high speed. It is presumed that variation depending on the lens current is less in the effect of the load fluctuation than in the effect of power constantly used in the video only mode. Therefore, in the general shooting mode, the lower-limit voltage Vuc is less likely to change depending on the mounted interchangeable lens 101 and is set to the same set value V10 for lens categories A to D as shown in FIG. 4A, for example (S5).

The set value V10 in the general shooting mode may be a value high enough to normally perform the process turning off the power supply of the digital camera 100 even when the load fluctuation is large as in condition (1) above. Therefore, in the general shooting mode, for the lens categories C, D where the lens current Lc is large, the lower-limit voltage Vuc can be reduced more than the set values V11, V12 in the video only mode, for example.

Although the example of acquiring the lens data from the interchangeable lens 101 has been described in step S1 above, the camera controller 153 may additionally acquire the lens table T2. Further, in step S1, the camera controller 153 may acquire the lens table T2 instead of the lens data. In this case, in step S3, the lens category can be determined based on the maximum current in the lens table T2, for example.

The flowchart of FIG. 6 may be started not only when the interchangeable lens 101 is mounted, but also when the digital camera 100 is started up or when the operation of each shooting mode starts, for example. In this case, the lens category may be determined at the time of mounting of the interchangeable lens 101 is stored in the digital camera 100, and the process of communicating with the interchangeable lens 101 to determine the lens category (S1, S2) need not be particularly performed.

2-4. Control of Remaining Capacity Indication

After setting the lower-limit voltage Vuc as described above, the digital camera 100 of the present embodiment controls an indication on the LCD monitor 163 in accordance with the remaining capacity of the battery 201, that is, a remaining capacity indication, for example. Such control of the remaining capacity indication the digital camera 100 will be described below with reference to FIGS. 8 to 10.

Figure 8:
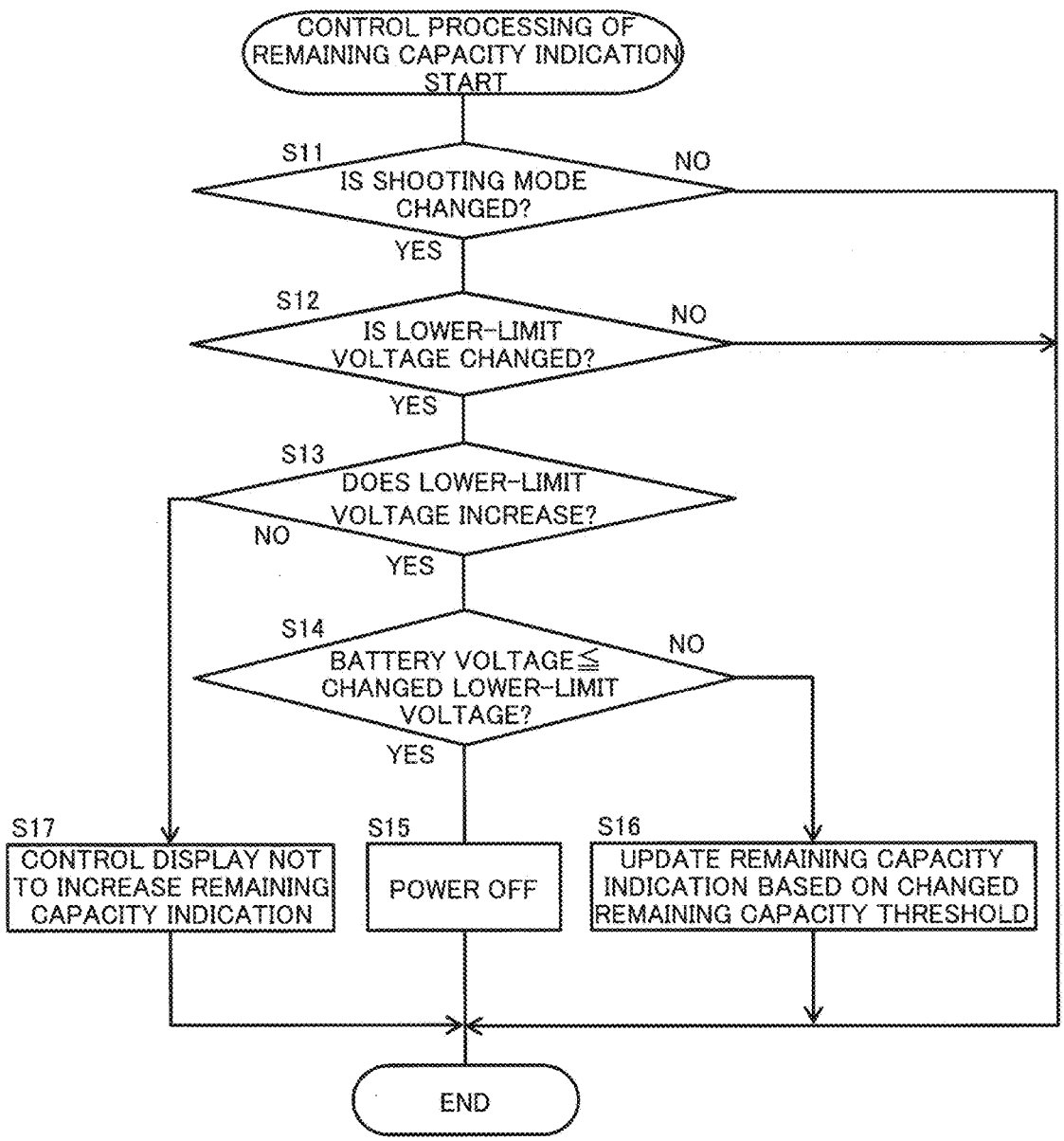
FIG. 8 is a flowchart for explaining control of a remaining capacity indication in the digital camera.

FIG. 8 is a flowchart for explaining the control of the remaining capacity indication in the digital camera 100 of the present embodiment. The flowchart shown in FIG. 8 is started, after performing the setting processing for the lower-limit voltage Vuc (FIG. 6), in a state where the setting result of the lower-limit voltage Vuc and the lens category determined in step S2 are held in the DRAM 155 or the like, for example. Each process shown in the flowchart of FIG. 8 is performed at a predetermined cycle (e.g., 10 milliseconds) by the camera controller 153, for example.

First, the camera controller 153 determines whether or not the shooting mode is changed based on the operation signal from the mode switching dial 174, for example (S11). For example, when an operation switching the shooting mode is input by the mode switching dial 174, the camera controller 153 determines that the shooting mode is changed (YES in S11).

When the shooting mode is changed (YES in S11), the camera controller 153 determines whether or not the lower-limit voltage Vuc is to be changed, in the changed shooting mode, from the setting result based on the operation signal and the held lens category, for example (S12). The camera controller 153 determines the set value for the lower-limit voltage Vuc corresponding to the current lens category and the changed shooting mode, referring to the set value table Tv, and compares the determined set value with the held setting result to make the determination in step S12, for example.

When there is a change in the lower-limit voltage Vuc (YES in S12), the camera controller 153 determines whether or not the lower-limit voltage Vuc increases from before the change (S13). Specifically, in step S13, the camera controller 153 determines whether or not the lower-limit voltage Vuc corresponding to the changed shooting mode exceeds the held setting result.

For example, in the set value table Tv of FIG. 7, when the mode is changed from the video only mode to the general shooting mode in a case where the interchangeable lens 101 of the lens category A or B is mounted, it is determined that the lower-limit voltage Vuc increases, as shown in FIGS. 4A and 4B (YES in S13). Also, when the mode is changed from the general shooting mode to the video only mode in a case where the interchangeable lens 101 of the lens category C or D is mounted, it is determined that the lower-limit voltage Vuc increases (YES in S13).

In the case where the lower-limit voltage Vuc increases (YES in S13), it is expected that the current battery voltage becomes the changed lower-limit voltage Vuc or less even when the current battery voltage exceeds the lower-limit voltage Vuc before the change. Therefore, in this case, the camera controller 153 determines whether or not the current battery voltage of the battery 201 is equal to or less than the changed lower-limit voltage Vuc determined in step S12 based on the detection signal from the voltage detection circuit, for example (S14).

When the battery voltage is equal to or less than the changed lower-limit voltage Vuc (YES in S14), the camera controller 153 performs a processing to stop the operation of the digital camera 100 and to turn off the power (S15). In step S15, the camera controller 153 causes the LCD monitor 163 to display a predetermined message before turning off the power, for example.

Figure 9:
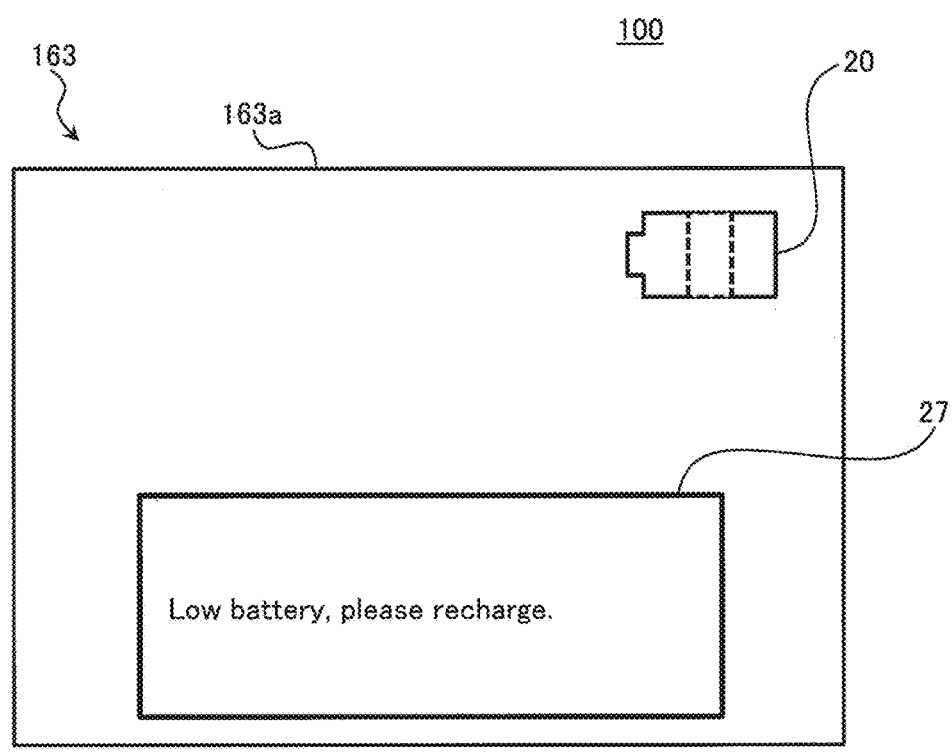
FIG. 9 is a diagram showing an example of display in the control of the remaining capacity indication in the digital camera.

FIG. 9 is a diagram showing an example of display of step 15 in the digital camera 100. In this case, as exemplified in FIG. 9, the camera controller 153 causes the LCD monitor 163 to display a caution message 27 or the like prompting the user to discontinue using the digital camera 100. The LCD monitor 163 of FIG. 9 displays, on the display screen 163a, a remaining capacity indication 20 indicating the remaining capacity of the battery 201 in addition to the message 27.

For example, the camera controller 153 performs, in parallel with the processing shown in the flowchart of FIG. 8, a display processing to display the remaining capacity indication 20 based on the detection signal of the battery voltage from the voltage detection circuit, referring to a threshold table of the remaining capacity stored in advance in the flash memory 156 or the like. The threshold table of the remaining capacity stores thresholds of voltage values to classify the remaining capacity of the battery 201 into a plurality of stages for each shooting mode, for example. In the example of display of FIG. 9, the remaining capacity of the battery 201 is managed in three stages, and the remaining capacity indication 20 corresponding to a stage of insufficient remaining capacity is displayed. The threshold of each stage is set in accordance with the lower-limit voltage Vuc in each shooting mode for each predetermined ratio of the remaining capacity of the battery 201, for example.

On the other hand, when the battery voltage is higher than the changed lower-limit voltage Vuc (NO in S14), the camera controller 153 updates the remaining capacity indication 20 displayed on the LCD monitor 163, referring to the threshold table of the remaining capacity in accordance with the changed shooting mode, for example (S16). The camera controller 153 may further change, the threshold table of the remaining capacity referred to in the aforementioned display processing of the remaining capacity indication 20 performed in parallel with the control of the remaining capacity indication in FIG. 8, similarly to the control described above, for example.

Figure 10A:
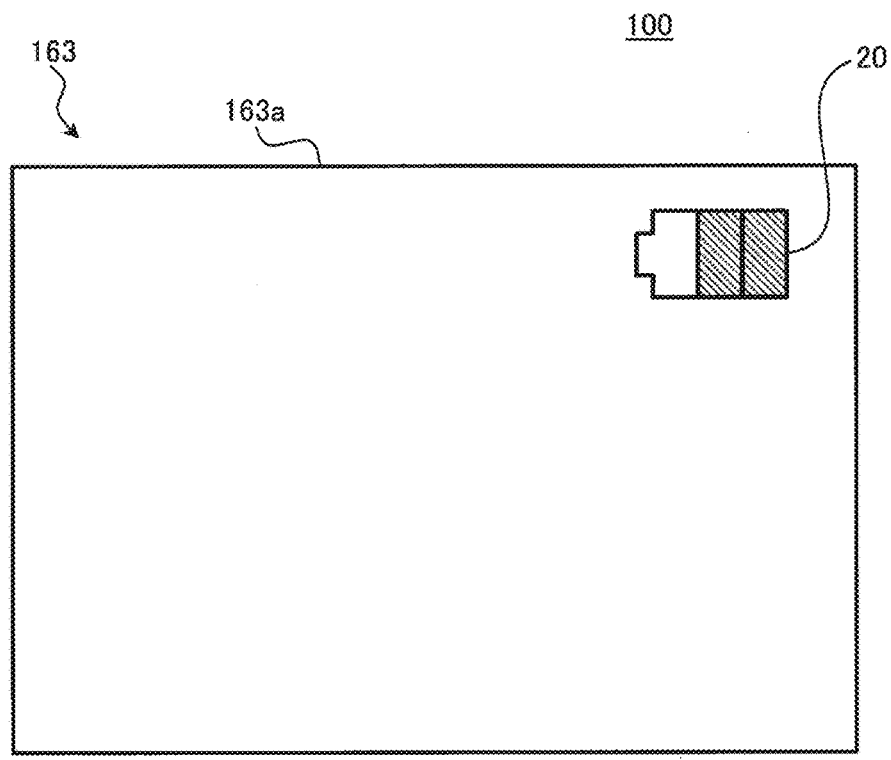
FIGS. 10A and 10B are diagrams showing an example of updating the remaining capacity indication in the digital camera.
Figure 10B:
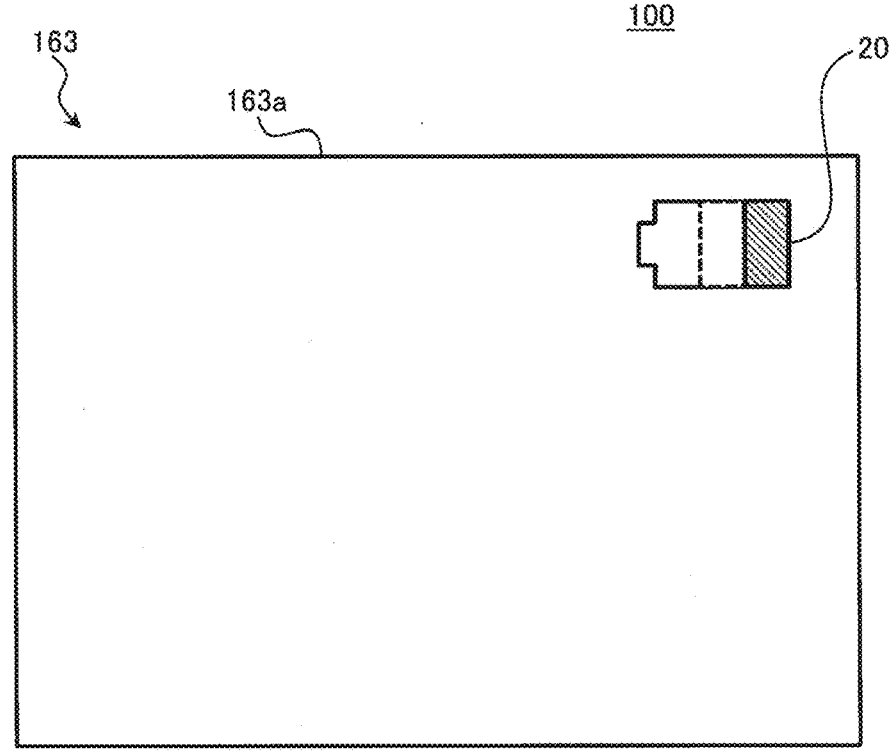

FIGS. 10A and 10B are diagrams showing an example of updating the remaining capacity indication 20 in the digital camera 100 of the present embodiment. FIG. 10A illustrates the remaining capacity indication 20 corresponding to the shooting mode before the change. FIG. 10B illustrates the remaining capacity indication 20 updated in step S16 when the shooting mode is changed from the example of FIG. 10A and the current remaining capacity of the battery exceeds the threshold in the threshold table of the changed remaining capacity.

In the examples of FIGS. 10A and 10B, the lower-limit voltage Vuc increases due to the change in the shooting mode (YES in S13), and the remaining capacity indication 20 is updated as if the remaining capacity has decreased in response to the threshold being higher than before the change in the threshold table of the remaining capacity after the change. Such updating of the remaining capacity indication 20 allows, even when there is no change in the battery voltage, the user to check the remaining capacity of the battery 201 in accordance with each shooting mode, facilitating the use of the digital camera 100, for example.

On the other hand, when the lower-limit voltage Vuc does not increase due to the change in the shooting mode (NO in S13), the lower-limit voltage Vuc may decrease and there may be margin in the remaining capacity before used up. However, in this case, the camera controller 153 of the present embodiment performs display control so as not to update in the remaining capacity indication 20 to indicate an increase in the remaining capacity (S17). For example, in the display processing of the remaining capacity indication 20 described above, the camera controller 153 performs control so as to maintain the current remaining capacity indication 20 until the battery voltage decreases to a predetermined value. The predetermined value may be set to a threshold value of the next stage in which the remaining capacity indication 20 is to be updated to indicate a decrease in the remaining capacity, in the threshold table of the remaining capacity for the changed shooting mode.

Therefore, even when the lower-limit voltage Vuc decreases due to the change in the shooting mode, the remaining capacity indication 20 is not updated such that the remaining capacity of the battery 201 temporarily increases, making it easier for the user to use the digital camera 100, for example. The camera controller 153 may display the remaining capacity indication 20 in accordance with the changed remaining capacity threshold table when the power switch 152 is operated to turn off and turn on the power of the digital camera 100 during maintaining the remaining capacity indication 20.

When there is no change in the shooting mode (NO in S11) or when there is no change in the lower-limit voltage Vuc accompanying the change in the shooting mode (NO in S12), the camera controller 153 ends the processing of the present flowchart. Similarly, after performing each of steps S15 to S17, the camera controller 153 ends the processing of the present flowchart. Thereafter, the camera controller 153 performs the aforementioned display processing of the remaining capacity indication 20 in accordance with the battery voltage of the battery 201, for example.

According to the above processing, when the lower-limit voltage Vuc is changed in accordance with the change in the shooting mode (YES in S11, YES in S12), updating the remaining capacity indication 20 or the like is controlled in accordance with the changed lower-limit voltage Vuc (S13, S14) (S15 to S17). This makes it easier for the user to check the remaining capacity of the battery 201 for each shooting mode, for example.

In the above processing, the control of the remaining capacity indication in response to changing the shooting mode has been described. For example, the digital camera 100 may perform the control of the remaining capacity indication when a different interchangeable lens 101 is mounted after the setting processing for the lower-limit voltage Vuc is performed (FIG. 6). In this case, instead of or in addition to step S11 in FIG. 8, similarly to steps S1 and S2 in FIG. 6, the lens category may be determined by communication with the interchangeable lens 101, for example.

3. Summary

As described above, the digital camera 100 of the present embodiment is an example of the imaging apparatus that can be mounted with the interchangeable lens 101 and operates with power from the battery 201. The digital camera 100 includes the body mount 140 (an example of a connector), the camera controller 153 (an example of a controller), and the mode switching dial 174 (an example of a selector). The body mount 140 is detachably connect the camera body 102 of the digital camera 100 with the interchangeable lens 101. The camera controller 153 controls a lower-limit voltage Vuc indicating a lower limit in supplying power from the battery 201. The mode switching dial 174 selects one shooting mode from a plurality of shooting modes as an example of a plurality of operation modes in which the digital camera 100 is operated with power from battery 201. Based on the interchangeable lens 101 connected to the body mount 140 and the shooting mode selected by the mode switching dial 174, the camera controller 153 switches the lower-limit voltage Vuc among a plurality of set values V1 to V12. Each of the plurality of set values V1 to V12 corresponds to a combination among combinations of the lens categories A to D as an example of the types of the interchangeable lens 101 and the plurality of shooting modes (S1 to S5).

According to the above digital camera 100, the lower-limit voltage Vuc is set in accordance with both the lens categories A to D of the mounted interchangeable lens 101 and the selected shooting mode. Therefore, as shown in FIGS. 4A and 4B, the lower-limit voltage Vuc set in each shooting mode can be reduced more than in a case where the lower-limit voltage Vuc is set only in accordance with the lens categories A to D (FIG. 3), for example.

In the present embodiment, the plurality of shooting modes include a general shooting mode (an example of a first operation mode) restricting the execution of the shooting operation in the high-load video mode (an example of a second shooting operation) in a state where the shooting operation in the high-speed continuous shooting mode (an example of a first shooting operation) can be executed in the digital camera 100, and a video only mode (an example of a second operation mode) restricting the execution of the shooting operation in the high-speed continuous shooting mode in a state where the shooting operation in the high-load video mode can be executed. The camera controller 153 switches the lower-limit voltage Vuc in accordance with whether the shooting mode selected by the mode switching dial 174 is the general shooting mode or the video only mode (S3, S4, S5). For example, the shooting operation in the high-speed continuous shooting mode corresponding to condition (1) and the shooting operation in the high-load video mode corresponding to condition (2) as described above can be executed only in one of the general shooting mode and the video only mode. In each shooting mode, the lower-limit voltage Vuc can be switched to a set value which is set considering only one of conditions (1) and (2), and thus it is possible to avoid setting the lower-limit voltage Vuc higher than necessary.

In the present embodiment, the lens categories A to D, which are examples of the types of the interchangeable lens 101, are classified in accordance with the magnitude of the power consumption of the interchangeable lens 101. The set value of the lower-limit voltage Vuc in the video only mode increases with an increase in the power consumption of the interchangeable lens 101 increases, and the set value of the lower-limit voltage Vuc in the general shooting mode increases less than in the video only mode among the lens categories A to D. For example, the lower-limit voltages Vuc in the general shooting mode and the video only mode as shown in FIGS. 4A and 4B are set using the set value table Tv in FIG. 7.

In the present embodiment, in the lens categories A and B, as an example of a case where power consumption of the interchangeable lens 101 connected to the body mount 140 is less than a predetermined value (e.g., 600 mA), the set value of the lower-limit voltage Vuc in the video only mode is smaller than the set value of the lower-limit voltage Vuc in the general shooting mode. As described above, when the power consumption of the interchangeable lens 101 is lower than the predetermined value, the set lower-limit voltage Vuc can be reduced in the shooting operation in the general shooting mode in which it is not necessary to consider the high-speed continuous shooting mode, that is, the shooting operation with the load fluctuation being particularly steep as in the above condition (1).

In the present embodiment, in the lens categories C and D, as an example of a case where power consumption of the interchangeable lens connected to the body mount 140 is a predetermined value (e.g., 600 mA) or more, the set value of the lower-limit voltage Vuc in the general shooting mode is smaller than the set value of the lower-limit voltage Vuc in the video only mode. As described above, in a case where the power consumption of the interchangeable lens 101 is higher than the predetermined value, the set lower-limit voltage Vuc can be reduced in the general shooting mode in which it is not necessary to consider the high-load video mode, that is, the shooting operation with the power constantly used is particularly high as in the above condition (2).

In the present embodiment, the digital camera 100 further includes the flash memory 156 (an example of the storage) that stores the set value table Tv as an example of information indicating the set value of the lower-limit voltage Vuc for each combination of the plurality of shooting modes (an example of the plurality of operation modes) and the lens categories A to D (an example of the types of the interchangeable lens 101). The information indicating the set value is not limited to the set value table Tv illustrated in FIG. 5 but may be stored in other manners.

In the present embodiment, the body mount 140 is connected to the interchangeable lens 101 allow data communication to acquire lens information from the interchangeable lens 101 (S1, S2). The lens information includes at least one of lens data as an example of information identifying the interchangeable lens 101 and lens current data as an example of information specifying the power consumption of the interchangeable lens 101 for each of the plurality of shooting modes. The lens current data can be acquired as the body table T1 or the lens table T2 shown in FIGS. 2A and 2B, for example.

In the present embodiment, the digital camera 100 further includes the LCD monitor 163 (an example of the display) that displays the remaining capacity indication 20 as an example of remaining capacity information indicating the remaining capacity of battery 201. The camera controller 153 updates the lower-limit voltage Vuc in accordance with a change in at least one of the interchangeable lens 101 connected to the body mount 140 and the shooting mode selected by the mode switching dial 174, and controls display of the remaining capacity indication 20 based on the lower-limit voltage Vuc before and after updating (S11 to S17). For example, when the updated lower-limit voltage Vuc is equal to or more than the lower-limit voltage Vuc before updating (YES in S13), the camera controller 153 updates the remaining capacity indicated by the remaining capacity indication 20 based on the updated lower-limit voltage Vuc (S16). When the updated lower-limit voltage Vuc is less than the lower-limit voltage Vuc before updating (NO in S13), the camera controller 153 controls display of the remaining capacity indication 20 so that the remaining capacity indicated by the remaining capacity indication 20 does not increase (S17). This makes it easier for the user to use the digital camera 100, for example.

Second Embodiment

Hereinafter, a second embodiment will be described with reference to FIGS. 11, 12A, and 12B. In the first embodiment, the digital camera 100 that switches between the settings of the lower-limit voltage Vuc in accordance with the selection of the general shooting mode or the video only mode has been described. In the second embodiment, a digital camera 100 that further subdivides the settings of the lower-limit voltage Vuc will be described.

The digital camera 100 according to the present embodiment will be described below, omitting, as appropriate, descriptions of configurations and operations similar to those of the digital camera 100 according to the first embodiment.

Figure 11:
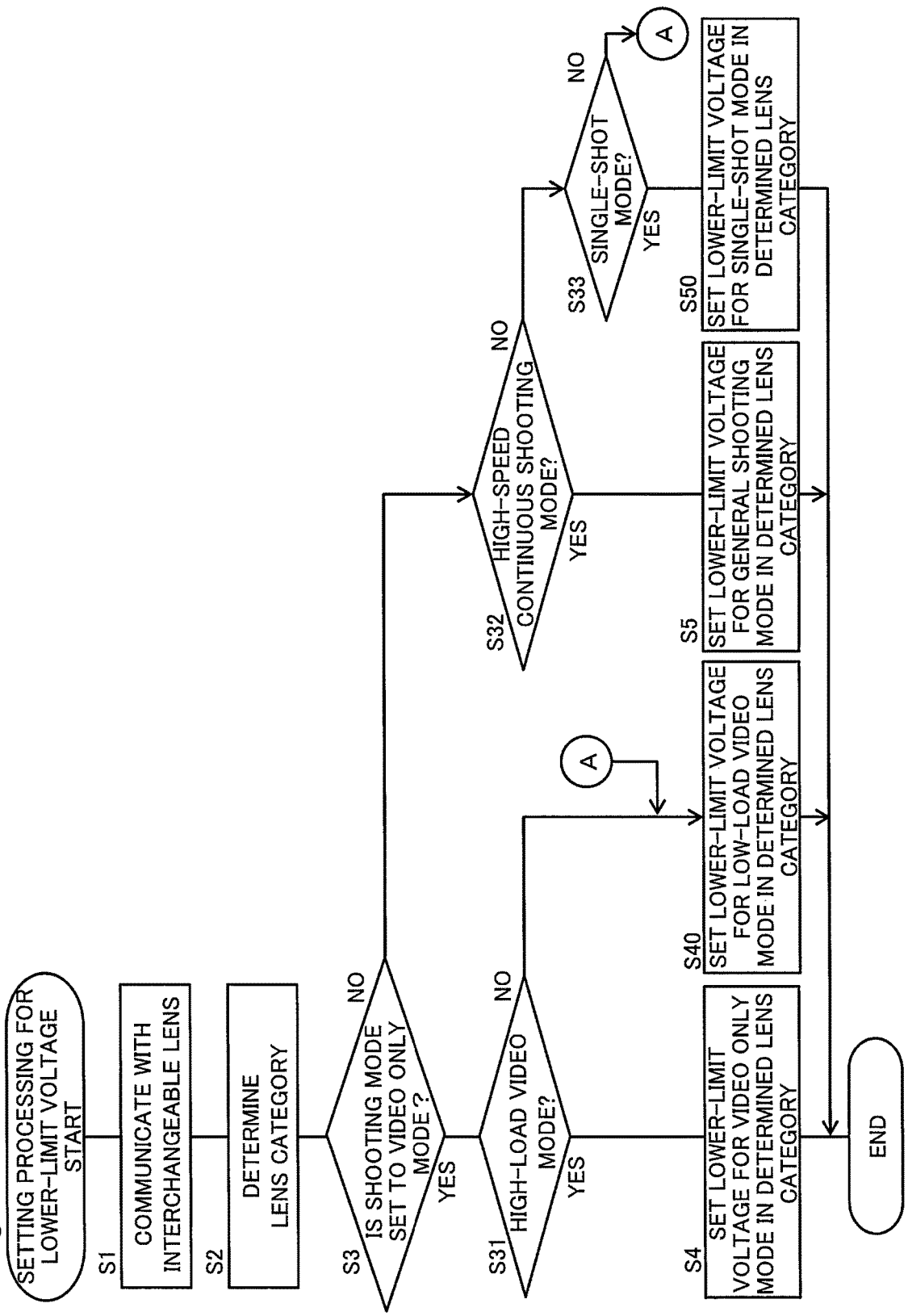
FIG. 11 is a flowchart illustrating a setting processing for the lower-limit voltage in the digital camera according to a second embodiment.

FIG. 11 is a flowchart illustrating a setting processing for the lower-limit voltage Vuc in the digital camera 100 of the present embodiment. Hereinafter, the description similar to that with reference to FIG. 6 in the first embodiment will be omitted as appropriate.

In the setting processing for the lower-limit voltage Vuc of the present embodiment, the camera controller 153 performs processes subdividing the settings for the lower-limit voltage Vuc (S31 to S50) in addition to the processes similar to that of the first embodiment (S1 to S5), for example. For example, in each shooting mode, it is determined whether or not a drive mode to execute a specific shooting operation is selected (S31 to S32), and the lower-limit voltage Vuc more subdivided than in the first embodiment is set in accordance with the determination result (S40 to S50).

For example, when the shooting mode of the digital camera 100 is the video only mode (YES in S3), the camera controller 153 of the present embodiment further determines the drive mode selected in the video only mode, based on the operation signal from the operation member 170, for example (S31). For example, the camera controller 153 determines whether the drive mode is the high-load video mode or the low-load video mode instead of the high-load video mode (S31).

When the drive mode is the high-load video mode (YES in S31), the camera controller 153 sets the lower-limit voltage Vuc for the video only mode as in the first embodiment (S4). This lower-limit voltage Vuc for the video only mode is set in consideration of the shooting operation in the high-load video mode in which the constantly used power is particularly high as in condition (1) described above.

In contrast, when the drive mode is the low-load video mode (NO in S31), the camera controller 153 sets the lower-limit voltage Vuc for the low-load video mode different from the lower-limit voltage Vuc for the video only mode in accordance with a determination result of the lens category (S2) (S40).

FIGS. 12A and 12B are diagrams for explaining a setting processing for the lower-limit voltage Vuc in the digital camera 100 of the present embodiment. FIG. 12A shows an example of setting the lower-limit voltage Vuc in the lens category A where the lens current Lc is the smallest among the lens categories A to D. FIG. 12B shows an example of setting the lower-limit voltage Vuc in the lens category D where the lens current Lc is the largest among the lens categories A to D. In addition to the example of setting the lower-limit voltage Vuc, FIGS. 12A and 12B each show load fluctuation and power consumption in each of the camera body 102 and the interchangeable lens 101 in each of shooting modes of single-shot, high-speed continuous shooting, a low-load moving image, and a high-load moving image. In FIG. 12, for comparison, the example of setting the lower-limit voltage Vuc also shows a set value in a case where the lower-limit voltage Vuc is set only in accordance with the lens category.

For example, as shown in FIG. 12A, in the lens category A, the set value V1 is set to the lower-limit voltage Vuc in the high-load video mode, while the set value V21 lower than the set value V1 is set to the lower-limit voltage Vuc in the low-load video mode. As shown in FIG. 12B, in the lens category D as well, in the low-load video mode, the set value V22 lower than the set value V12 of the high-load video mode is set to the lower-limit voltage Vuc. In the example of the lens category A shown in FIG. 12A, even in the high-load video mode, the set value V1 lower than the set value V10 only in accordance with the lens category is set.

On the other hand, when the shooting mode of the digital camera 100 is not the video only mode but the general shooting mode (NO in S3), the camera controller 153 further determines the drive mode selected in the general shooting mode (S32). For example, the camera controller 153 determines whether or not the drive mode is the high-speed continuous shooting mode (S32).

When the drive mode is the high-speed continuous shooting mode (YES in S32), the camera controller 153 sets the lower-limit voltage Vuc for the general shooting mode as in the first embodiment, for example (S5). This lower-limit voltage Vuc for the general shooting mode is set in consideration of the shooting operation in the high-speed continuous shooting mode in which the load fluctuation is particularly steep as in condition (2) described above. In the example of the lens category D in FIG. 12B, the set value V10 lower than the set value V12 only in accordance with the lens category is set.

When the drive mode is not the high-speed continuous shooting mode (NO in S32), the camera controller 153 determines whether the drive mode is the single-shot mode or the low-load video mode instead of the single-shot mode, for example (S33).

When the drive mode is the single-shot mode (YES in S33), the camera controller 153 sets the lower-limit voltage Vuc for the single-shot mode in accordance with the determination result of the lens category (S2) (S50). In the examples of FIGS. 12A and 12B, for each of the lens categories A and D, the set value V20, which is equal to or less than the set value V10 in the high-speed continuous shooting mode, is set to the lower-limit voltage Vuc.

When the drive mode is the low-load video mode (NO in S33), the camera controller 153 performs step S40 described above, for example.

When the lower-limit voltage Vuc is set in steps S4 to S50, the camera controller 153 ends the processing of the present flowchart.

According to the above processing, in addition to determining whether the shooting mode is the video only mode or the general shooting mode (S3), the drive mode selected in each shooting mode is determined (S31 to S33), and the lower-limit voltage Vuc in accordance with the lens category is set in each drive mode (S4 to S50). For example, in a drive mode in which a specific shooting operation is executed (YES in S31, YES in S32), the lower-limit voltage Vuc is set as in the first embodiment (S4, S5). On the other hand, in the other drive mode (NO in S31, NO in S32), a more subdivided lower-limit voltage Vuc is set (S40, S50). Thus, in each drive mode, the power of the battery 201 can be more efficiently used in accordance with the lens category.

As described above, in the digital camera 100 of the present embodiment, the camera controller 153 (an example of the controller) switches the lower-limit voltage Vuc between different set values in accordance with whether or not the execution of the shooting operation in the high-speed continuous shooting mode (an example of the first shooting operation) is restricted in the general shooting mode (an example of the first operation mode) (S32) (S5, S50). The camera controller 153 switches the lower-limit voltage Vuc between different set values in accordance with whether or not the execution of the shooting operation in the high-load video mode (an example of the second shooting operation) is restricted in the video only mode (an example of the second operation mode) (S31) (S4, S40).

According to the above digital camera 100, the setting of the lower-limit voltage Vuc can be subdivided, and a set value set without considering a shooting operation whose execution is restricted can be used as the lower-limit voltage Vuc, thereby enabling efficient use of power in the digital camera 100, for example.

Other Embodiments

As described above, the first and second embodiments have been described as examples of the technique disclosed in the present application. However, the technique in the present disclosure is not limited to this, and can also be applied to embodiments in which change, replacement, addition, omission, and the like are made as appropriate. Further, it is also possible to combine each constituent element described in each of the above embodiments to provide a new embodiment. Accordingly, other embodiments will be exemplified below.

In the above second embodiment, an example has been described in which, after it is determined whether the shooting mode is the video only mode or the general shooting mode (S3), the drive mode in each shooting mode is determined (S31 to S33). In the present embodiment, the determination in step S3 may not be executed, and after the lens category is determined (S2), the drive mode may be determined omitting step S3, for example (S31 to S33). Also in this case, as the operation mode of the digital camera 100, the lower-limit voltage Vuc in accordance with the lens category is set for each drive mode (S4 to S5, S40 to S50).

In each of the above embodiments, an example has been described in which various shooting modes of digital camera 100 are switched using the mode switching dial 174 as an example of the selector. In the present embodiment, the shooting modes may be switched using not only the mode switching dial 174 but also various operation members in the operation member 170 or a menu screen displayed on the LCD monitor 163, for example. This also enables selection of an operation mode from the plurality of operation modes such as the shooting modes of the digital camera 100.

In each of the embodiments described above, an example has been described in which in the control of the remaining capacity indication (FIG. 8), the power supply of the digital camera 100 is turned off (S15) when the shooting mode is changed (YES in S11) and the battery voltage is the changed lower-limit voltage Vuc or less (YES in S14). In the present embodiment, when the battery voltage is the changed lower-limit voltage Vuc or less (YES in S14), not only the power supply is turned off, but also various controls may be performed in accordance with the changed shooting mode or drive mode, for example. For example, similarly to steps S3 and S31 to S32 in FIG. 11 in the second embodiment, the camera controller 153 may determine the changed shooting mode and drive mode and perform various controls.

For example, when the shooting mode is the video only mode, instead of step S15, the camera controller 153 performs control to prohibit the selection of the high-load video mode on the menu screen for selecting the shooting mode displayed on the LCD monitor 163. For example, the camera controller 153 grays out a menu item for selecting the high-load video mode to display. Accordingly, the operation in the high-load video mode is not executed at a battery voltage being the lower-limit voltage Vuc or less, and therefore it is possible to avoid a situation in which and a stable operation of the digital camera 100 cannot be obtained, for example. Further, for example, when a user operation selecting a grayed-out menu item in the high-load video mode is input to the operation member 170, a message 27 or the like similar to that in FIG. 9 may be displayed.

As described above, in the present embodiment, when the lower-limit voltage Vuc is updated to be the voltage of the battery or more (YES in S14) in the video only mode (an example of the second operation mode), the camera controller 153 may restrict the execution of the shooting operation) in the high-load video mode (an example of the second shooting operation).

In the above embodiment, when the shooting mode is the general shooting mode and the high-speed continuous shooting mode is selected, the camera controller 153 may perform a forced stopping process of stopping the shooting operation of the digital camera 100 instead of step S15, for example. The forced stopping process includes various processes for stopping the operation in the shooting mode under execution, such as recording the shot image data in the memory card 164 or the like. Further, before the forced stopping process, a message 27 similar to that in FIG. 9 may be displayed, for example. At a battery voltage being the lower-limit voltage Vuc or less, when the operation in the high-speed continuous shooting mode in which the load fluctuation is particularly steep is executed, a situation is anticipated in which the battery voltage required for the operation is insufficient during the execution. By the forced stopping process, the operation under execution can be completed using the power available in the lower-limit value Vuc remaining in the battery 201.

In each of the above embodiments, an example has been described in which, when the battery voltage decreases to or below the lower-limit voltage Vuc, the process stopping the power supply to the digital camera 100 to turn off the power is performed. In the present embodiment, without being limited to this, when the battery voltage decreases to the lower-limit voltage Vuc or less during the shooting operation, the forced stopping process of the shooting operation may be performed, for example.

In each of the above embodiments, an example has been described in which the lower-limit voltage Vuc is set in accordance with the type of the interchangeable lens 101 and various operation modes of the digital camera 100. The digital camera of the present embodiment may further include a sensor that measures the temperature of the battery 201, and the lower-limit voltage Vuc may be set in accordance with the measured temperature, for example. In each of the above embodiments, an example has been described in which the remaining capacity indication control is performed in accordance with the change in the operation modes. However, in the present embodiment, the remaining capacity indication 20 may be further updated with reference to different threshold tables of the remaining capacity in accordance with the measured temperature of the battery 201.

In each of the above embodiments, an example in which the battery 201 is detachably mounted to the camera body 102 has been described. In the present embodiment, the battery 201 may be built in the camera body 102.

In each of the above embodiments, an example in which the lower-limit voltage Vuc in the battery 201 of the camera body 102 is set has been described. In the present embodiment, without being limited to the battery 201 of the camera body 102, and a battery grip that is an external battery device may be mounted to the camera body 102, for example. In this case, in addition to or instead of the battery 201 described above, the lower-limit voltage in the battery of the battery grip may be set in accordance with the type of the interchangeable lens 101 and the operation mode of the digital camera 100.

Further, in each of the above embodiments, the lens-interchangeable digital camera has been described as an example of the imaging apparatus. The idea of the present disclosure is applicable not only to a digital camera but also to various imaging apparatuses having a plurality of operation modes, such as a lens-interchangeable video camera.

As described above, the embodiments have been described as examples of the technique in the present disclosure. For this purpose, the accompanying drawings and the detailed description have been provided.

Accordingly, some of the constituent elements described in the accompanying drawings and the detailed description may also include constituent elements that are not indispensable for solving the problem in order to exemplify the above technique in addition to indispensable constituent elements for solving the problem. Therefore, these constituent elements that are not indispensable are not to be immediately recognized to be indispensable based on the fact that these constituent elements that are not indispensable are described in the accompanying drawings or the detailed description.

In addition, since the above-described embodiments are intended to exemplify the technique in the present disclosure, it is possible to make various changes, replacements, additions, omissions, and the like within the scope of claims or the equivalent thereof.

ASPECTS OF PRESENT DISCLOSURE

According to a first aspect of the present disclosure, there is provided an imaging apparatus that can be mounted with an interchangeable lens and operates with power from a battery. The imaging apparatus according to the first aspect includes: a connector to detachably connect the imaging apparatus with the interchangeable lens; a controller to control a lower-limit voltage indicating a lower limit in supplying power from the battery; and a selector to select one operation mode from a plurality of operation modes in which the imaging apparatus is operated with power from the battery. The controller switches the lower-limit voltage among a plurality of set values, based on an interchangeable lens connected to the connector and an operation mode selected by the selector, the plurality of set values each corresponding to a combination among combinations of types of the interchangeable lens and the plurality of operation modes based on the interchangeable lens connected to the connector and the operation mode selected by the selector.

According to a second aspect of the present disclosure, there is provided an imaging apparatus according to the first aspect, in which the plurality of operation modes include a first operation mode restricting execution of a second shooting operation in a state where the first shooting operation is executable in the imaging apparatus, and a second operation mode restricting execution of the first shooting operation in a state where the second shooting operation is executable. The controller switches the lower-limit voltage in accordance with whether the operation mode selected by the selector is the first operation mode or the second operation mode.

According to a third aspect of the present disclosure, there is provided the imaging apparatus according to the second aspect, in which the types of the interchangeable lens are classified in accordance with the magnitude of power consumption of the interchangeable lens, a set value of the lower-limit voltage in the second operation mode increases with an increase in the power consumption of the interchangeable lens, and a set value of the lower-limit voltage in the first operation mode increases lens less than in the second operation mode among the types of the interchangeable.

According to a fourth aspect of the present disclosure, there is provided the imaging apparatus according to the third aspect, in which when power consumption of the interchangeable lens connected to the connector is less than a predetermined value, the set value of the lower-limit voltage in the second operation mode is smaller than the set value of the lower-limit voltage in the first operation mode.

According to a fifth aspect of the present disclosure, there is provided the imaging apparatus according to the third aspect or the fourth aspect, in which when power consumption of the interchangeable lens connected to the connector is a predetermined value or more, the set value of the lower-limit voltage in the first operation mode is smaller than the set value of the lower-limit voltage in the second operation mode.

According to a sixth aspect of the present disclosure, the imaging apparatus according to any one of the second to fifth aspects is provided, in which in the first operation mode, the controller switches the lower-limit voltage between different set values in accordance with whether execution of the first shooting operation is restricted or not, and in the second operation mode, the controller switches the lower-limit voltage between different set values in accordance with whether execution of the second shooting operation is restricted or not.

According to a seventh aspect of the present disclosure, there is provided the imaging apparatus according to any one of the first to sixth aspects, further including a storage to store information indicating a set value of the lower-limit voltage for each of the combinations of the plurality of operation modes and the types of the interchangeable lens.

According to an eighth aspect of the present disclosure, there is provided the imaging apparatus according to any one of the first to seventh aspects, in which the connector is connected with the interchangeable lens to allow data communication to acquire lens information from the interchangeable lens, and the lens information includes at least one of information identifying the interchangeable lens and information specifying power consumption of the interchangeable lens for each of the plurality of operation modes.

According to a ninth aspect of the present disclosure, there is provided the imaging apparatus according to any one of the first to eighth aspects, further including a display to display remaining capacity information indicating a remaining capacity of the battery, in which the controller updates the lower-limit voltage in accordance with a change in at least one of the interchangeable lens connected to the connector and the operation mode selected by the selector, and the controller controls display of the remaining capacity information based on a lower-limit voltage before and after updating.

The present disclosure is applicable to various imaging apparatuses to which an interchangeable lens can be mounted and which have a plurality of operation modes.

The invention claimed is:

1. An imaging apparatus that can be mounted with an interchangeable lens and operates with power from a battery, the imaging apparatus comprising:
   a connector to detachably connect the imaging apparatus with the interchangeable lens;
   a controller to control a lower-limit voltage indicating a lower limit in supplying power from the battery; and
   a selector to select one operation mode from a plurality of operation modes in which the imaging apparatus is operated with power from the battery, wherein
   the plurality of operation modes include
   a first operation mode allowing execution of a first shooting operation and not allowing execution of a second shooting operation in the imaging apparatus, and
   a second operation mode allowing execution of the second shooting operation and not allowing execution of the first shooting operation, wherein
   the first shooting operation performs image shooting with a larger load fluctuation than in the second shooting operation, and
   the second shooting operation performs video shooting with higher power consumption than in the first shooting operation, wherein
   the controller switches the lower-limit voltage in accordance with whether the operation mode selected by the selector is the first operation mode or the second operation mode.

2. The imaging apparatus according to claim 1, wherein the controller switches the lower-limit voltage among a plurality of set values, based on an interchangeable lens connected to the connector and an operation mode selected by the selector, the plurality of set values each corresponding to a combination among combinations of types of the interchangeable lens and the plurality of operation modes.

3. The imaging apparatus according to claim 2, wherein
   the types of the interchangeable lens are classified in accordance with magnitude of power consumption of the interchangeable lens,
   a set value of the lower-limit voltage in the second operation mode increases with an increase in the power consumption of the interchangeable lens, and
   a set value of the lower-limit voltage in the first operation mode increases less than in the second operation mode among the types of the interchangeable lens.

4. The imaging apparatus according to claim 3, wherein when power consumption of the interchangeable lens connected to the connector is less than a predetermined value, the set value of the lower-limit voltage in the second operation mode is smaller than the set value of the lower-limit voltage in the first operation mode.

5. The imaging apparatus according to claim 3, wherein when power consumption of the interchangeable lens connected to the connector is a predetermined value or more, the set value of the lower-limit voltage in the first operation mode is smaller than the set value of the lower-limit voltage in the second operation mode.

6. The imaging apparatus according to claim 2, wherein in the first operation mode, the controller switches the lower-limit voltage between different set values in accordance with whether execution of the first shooting operation is restricted or not, and in the second operation mode, the controller switches the lower-limit voltage between different set values in accordance with whether execution of the second shooting operation is restricted or not.

7. The imaging apparatus according to claim 1, further comprising a storage to store information indicating a set value of the lower-limit voltage for each of the combinations of the plurality of operation modes and the types of the interchangeable lens.

8. The imaging apparatus according to claim 1, wherein
the connector is connected with the interchangeable lens to allow data communication to acquire lens information from the interchangeable lens, and
the lens information includes at least one of information identifying the interchangeable lens and information specifying power consumption of the interchangeable lens for each of the plurality of operation modes.

9. The imaging apparatus according to claim 1, further comprising a display to display remaining capacity information indicating a remaining capacity of the battery, wherein the controller updates the lower-limit voltage in accordance with a change in at least one of the interchangeable lens connected to the connector and the operation mode selected by the selector, and the controller controls display of the remaining capacity information based on a lower-limit voltage before and after updating.

10. The imaging apparatus according to claim 1, wherein
the first shooting operation shoots still images at a predetermined continuous-shooting speed or more, and
the second shooting operation shoots a moving image in higher image quality than predetermined image quality.

11. The imaging apparatus according to claim 1, wherein
the first shooting operation has a largest load fluctuation among all shooting operations executable in the plurality of operation modes, and
the second shooting operation has highest power consumption among the all shooting operations executable in the plurality of operation modes.

* * * * *